United States Patent
Kass

(10) Patent No.: US 10,313,661 B2
(45) Date of Patent: Jun. 4, 2019

(54) WIDE BASELINE STEREO FOR LOW-LATENCY RENDERING

(71) Applicant: MAGIC LEAP, INC., Plantation, FL (US)

(72) Inventor: Michael Kass, Cupertino, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/459,920

(22) Filed: Mar. 15, 2017

(65) Prior Publication Data
US 2017/0272729 A1  Sep. 21, 2017

Related U.S. Application Data

(60) Provisional application No. 62/308,418, filed on Mar. 15, 2016.

(51) Int. Cl.
*H04N 13/117* (2018.01)
*H04N 13/279* (2018.01)
(Continued)

(52) U.S. Cl.
CPC ....... *H04N 13/279* (2018.05); *G02B 27/0172* (2013.01); *G06F 1/163* (2013.01); *G06F 3/002* (2013.01); *G06F 3/011* (2013.01); *G06F 3/012* (2013.01); *G06F 3/013* (2013.01); *G06F 3/0304* (2013.01); *G06T 15/205* (2013.01);
(Continued)

(58) Field of Classification Search
None
See application file for complete search history.

(56) References Cited

U.S. PATENT DOCUMENTS

| 9,240,069 B1 | 1/2016 | Li |
| 2012/0182403 A1 | 7/2012 | Lange |

(Continued)

FOREIGN PATENT DOCUMENTS

WO   WO 2016/017144   2/2016

OTHER PUBLICATIONS

PCT International Search Report and Written Opinion for International Appln. No. PCT/US17/22554, applicant Magic Leap, Inc., forms PCT/ISA/210, 220, and 237, dated Jun. 5, 2017 (8 pages).

(Continued)

*Primary Examiner* — Ke Xiao
*Assistant Examiner* — Jed-Justin Imperial
(74) *Attorney, Agent, or Firm* — Vista IP Law Group LLP

(57) ABSTRACT

A virtual image generation system and method of operating same are provided. A left synthetic image and a right synthetic image of a three-dimensional scene are rendered respectively from a first left focal center and a first right focal center relative to a first viewpoint. The first left and first right focal centers are spaced from each other a distance greater than the inter-ocular distance of an end user. The synthetic image and the right synthetic image are warped respectively to a second left focal center and a second right focal center relative to a second viewpoint different from the first viewpoint. The second left and right focal centers are spaced from each other a distance equal to the inter-ocular distance of the end user. A frame is constructed from the left and right warped synthetic images, and displayed to the end user.

20 Claims, 11 Drawing Sheets

(51) Int. Cl.
*H04N 13/344* (2018.01)
*H04N 13/366* (2018.01)
*H04N 13/398* (2018.01)
*G06T 15/20* (2011.01)
*G06F 1/16* (2006.01)
*G06F 3/01* (2006.01)
*G06F 3/03* (2006.01)
*G02B 27/01* (2006.01)
*G06F 3/00* (2006.01)

(52) U.S. Cl.
CPC ......... *H04N 13/117* (2018.05); *H04N 13/344* (2018.05); *H04N 13/366* (2018.05); *H04N 13/398* (2018.05); *G02B 2027/011* (2013.01); *G02B 2027/014* (2013.01); *G02B 2027/0134* (2013.01)

(56) References Cited

U.S. PATENT DOCUMENTS

| | | |
|---|---|---|
| 2015/0312558 A1 | 10/2015 | Miller et al. |
| 2015/0341616 A1* | 11/2015 | Siegel ................. H04N 13/111 348/54 |

OTHER PUBLICATIONS

Extended European Search Report dated Feb. 12, 2019 for EP Application No. 17767457.9, 8 pages.

* cited by examiner

WIDE BASELINE STEREO FOR LOW-LATENCY RENDERING

CROSS-REFERENCE TO RELATED APPLICATION(S)

This application claims priority from U.S. Provisional Patent Application Ser. No. 62/308,418, entitled "WIDE BASELINE STEREO FOR LOW-LATENCY RENDERING," filed on Mar. 15, 2016. The content of the aforementioned patent application is hereby expressly incorporated by reference in its entirety.

FIELD OF THE INVENTION

The present invention generally relates to systems and methods configured to facilitate interactive virtual or augmented reality environments for one or more users.

BACKGROUND

Modern computing and display technologies have facilitated the development of systems for so-called "virtual reality" or "augmented reality" experiences, wherein digitally reproduced images or portions thereof are presented to a user in a manner where they seem to be, or may be perceived as, real. A virtual reality (VR) scenario typically involves presentation of digital or virtual image information without transparency to other actual real-world visual input, whereas an augmented reality (AR) scenario typically involves presentation of digital or virtual image information as an augmentation to visualization of the actual world around the user.

For example, referring to FIG. 1, an augmented reality scene 4 is depicted wherein a user of an AR technology sees a real-world park-like setting 6 featuring people, trees, buildings in the background, and a concrete platform 8. In addition to these items, the user of the AR technology also perceives that he "sees" a robot statue 10 standing upon the real-world platform 8, and a cartoon-like avatar character 12 flying by which seems to be a personification of a bumble bee, even though these elements 10, 12 do not exist in the real world. As it turns out, the human visual perception system is very complex, and producing a VR or AR technology that facilitates a comfortable, natural-feeling, rich presentation of virtual image elements amongst other virtual or real-world imagery elements is challenging.

VR and AR display systems can benefit from information regarding the head pose of a viewer or user (i.e., the orientation and/or location of user's head).

For instance, head-worn displays (or helmet-mounted displays, or smart glasses) are at least loosely coupled to a user's head, and thus move when the user's head moves. If the user's head motions are detected by the display system, the data being displayed can be updated to take the change in head pose into account.

As an example, if a user wearing a head-worn display views a virtual representation of a three-dimensional (3D) object on the display and walks around the area where the 3D object appears, that 3D object can be re-rendered for each viewpoint, giving the user the perception that he or she is walking around an object that occupies real space. If the head-worn display is used to present multiple objects within a virtual space (for instance, a rich virtual world), measurements of head pose can be used to re-render the scene to match the user's dynamically changing head location and orientation and provide an increased sense of immersion in the virtual space.

Head-worn displays that enable AR (i.e., the concurrent viewing of real and virtual elements) can have several different types of configurations. In one such configuration, often referred to as a "video see-through" display, a camera captures elements of a real scene, a computing system superimposes virtual elements onto the captured real scene, and a non-transparent display presents the composite image to the eyes. Another configuration is often referred to as an "optical see-through" display, in which the user can see through transparent (or semi-transparent) elements in the display system to view directly the light from real objects in the environment. The transparent element, often referred to as a "combiner", superimposes light from the display over the user's view of the real world.

In both video and optical see-through displays, detection of head pose can enable the display system to render virtual objects such that they appear to occupy a space in the real world. As the user's head moves around in the real world, the virtual objects are re-rendered as a function of head pose, such that the virtual objects appear to remain stable relative to the real world. At least for AR applications, placement of virtual objects in spatial relation to physical objects (e.g., presented to appear spatially proximate a physical object in two- or three-dimensions) may be a non-trivial problem. For example, head movement may significantly complicate placement of virtual objects in a view of an ambient environment. Such is true whether the view is captured as an image of the ambient environment and then projected or displayed to the end user, or whether the end user perceives the view of the ambient environment directly. For instance, head movement will likely cause a field of view of the end user to change, which will likely require an update to where various virtual objects are displayed in the field of the view of the end user. Additionally, head movements may occur within a large variety of ranges and speeds. Head movement speed may vary not only between different head movements, but within or across the range of a single head movement. For instance, head movement speed may initially increase (e.g., linearly or not) from a starting point, and may decrease as an ending point is reached, obtaining a maximum speed somewhere between the starting and ending points of the head movement. Rapid head movements may even exceed the ability of the particular display or projection technology to render images that appear uniform and/or as smooth motion to the end user.

Head tracking accuracy and latency (i.e., the elapsed time between when the user moves his or her head and the time when the image gets updated and displayed to the user) have been problems for VR and AR systems. Especially for display systems that fill a substantial portion of the user's visual field with virtual elements, it is critical that the accuracy of head-tracking is high and that the overall system latency is very low from the first detection of head motion to the updating of the light that is delivered by the display to the user's visual system. If the latency is high, the system can create a mismatch between the user's vestibular and visual sensory systems, and generate motion sickness or simulator sickness. In the case of an optical see-through display, the user's view of the real world has essentially a zero latency while his or her view of the virtual objects has a latency that depends on the head-tracking rate, processing time, rendering time, and display frame rate. If the system latency is high, the apparent location of virtual objects will appear unstable during rapid head motions.

In addition to head-worn display systems, other display systems can benefit from accurate and low latency head pose detection. These include head-tracked display systems in which the display is not worn on the user's body, but is, e.g., mounted on a wall or other surface. The head-tracked display acts like a window onto a scene, and as a user moves his head relative to the "window" the scene is re-rendered to match the user's changing viewpoint. Other systems include a head-worn projection system, in which a head-worn display projects light onto the real world.

Approaches to addressing head tracking accuracy and latency may include increasing the actual frame rate or effective frame rate, for instance view strobing or flashing or via other techniques. Predictive head tracking may be employed to reduce latency. Predictive head tracking may rely on any of a large variety of factors or approaches, including historical data or attributes for a specific end user. Also, blanking of display or presentation may be effectively employed, for instance, blacking during rapid head movements.

Regardless of the type of display system used, the 3D objects are rendered from the current viewpoint or a predicted viewpoint at the time when the renders are displayed. In order to keep latency to a minimum, the rendered images are adjusted at the last moment to "chase the beam" in scanned displays. This is typically accomplished by warping the images; that is, the images are time warped to decrease the latency between the time the user moves his or her head and the time when the image gets updated. For example, assuming that images can only be presented to the user at 60 frames per second (FPS), an image rendering process that does not utilize time warping may determine the position of the user's head immediately after the previous image has been rendered and presented to the user, and may then render and display the next image to the user based on that head position. If the system presents images to the user at 60 frames per second (FPS), each image may take as long as 16.7 ms from the time that the head position is determined to the time that it is presented to the user, which is unacceptable. An image rendering process that utilizes time warping will determine or estimate the head position at the last moment possible before the image is presented to the user by warping an image previously rendered at an actual or estimated head position of the user.

Typically, images are typically warped using parallax. That is, because objects that are closer to the viewer move faster than objects that are further away from the viewer as a point of view changes (i.e., as the user's head moves), the warping process utilizes three-dimensional data to perform a two-dimensional warp on the image. Because an image of a scene rendered at a particular point of view may not contain all of the three-dimensional data of the same scene from a different particular point of view (e.g., one object completely hidden behind another object in the rendered image may be only partially hidden or not hidden at all at the different point of view), the parallax warping process may introduce holes in the resulting image due to the differing displacement of objects of different depths.

There, thus, is a need to reduce the frequency and size of holes in a warped image that has been rendered in a virtual reality or augmented reality environment.

SUMMARY

Embodiments of the present invention are directed to devices, systems and methods for facilitating virtual reality and/or augmented reality interaction for one or more users.

In accordance with one aspect of the present inventions, a method of operating a virtual image generation system is provided. The method comprises rendering a left synthetic image and a right synthetic image of a three-dimensional scene respectively from a first left focal center and a first right focal center relative to a first viewpoint. The first left and first right focal centers are spaced from each other a distance greater than an inter-ocular distance of an end user. The method further comprises warping the left synthetic image and the right synthetic image respectively to a second left focal center and a second right focal center relative to a second viewpoint different from the first viewpoint. The second left and right focal centers are spaced from each other a distance equal to the inter-ocular distance of the end user. The method further comprises constructing a frame from the left and right warped synthetic images, and displaying the frame to the end user.

In one embodiment, the left and right synthetic images are rendered in three dimensions and warped in two dimensions. The method may comprise generating left depth data and right depth data respectively for the left synthetic image and right synthetic image, in which case, the left synthetic image and the right synthetic image may respectively be warped using the left depth data and the right depth data. In one embodiment, the left synthetic image and the right synthetic image are rendered based on a first look-at point in the three-dimensional scene, and the left synthetic image and the right synthetic image are warped based on a second look-at point in the three-dimensional scene. The three-dimensional scene may include at least a portion of a virtual object that is not visible from the second left and right focal centers relative to the first view point, and is visible from the second left and right focal centers relative to the first view point. In one embodiment, an estimate of the first viewpoint is predicted and the second viewpoint is detected. In another embodiment, each of the first and second viewpoints is detected.

In accordance with another aspect of the present inventions, a virtual image generation system for use by an end user having an inter-ocular distance is provided. The virtual image generation system comprises memory storing a three-dimensional scene. The virtual image generation system further comprises a control subsystem (e.g., one that comprises a graphical processing unit (GPU)) configured for rendering a left synthetic image and a right synthetic image of the three-dimensional scene respectively from a first left focal center and a first right focal center relative to a first viewpoint. The first left and first right focal centers are spaced from each other a distance greater than the inter-ocular distance of the end user.

The control subsystem is further configured for warping the left synthetic image and the right synthetic image respectively to a second left focal center and a second right focal center relative to a second viewpoint different from the first viewpoint. The second left and right focal centers are spaced from each other a distance equal to the inter-ocular distance of the end user. The virtual image generation system may optionally further comprise one or more sensors configured for detecting the inter-ocular distance of the user. The virtual image generation system may further comprise a user orientation module configured for predicting an estimate of the first viewpoint and detecting the second viewpoint, or alternatively, detecting each of the first and second viewpoints.

In one embodiment, the left and right synthetic images are rendered in three dimensions and warped in two dimensions. The control subsystem may be further configured for generating left depth data and right depth data respectively for the left synthetic image and right synthetic image, in which case, the left synthetic image and the right synthetic image may be respectively warped using the left depth data and the right depth data. In another embodiment, the left synthetic image and the right synthetic image are rendered based on a first look-at point in the three-dimensional scene, and the left synthetic image and the right synthetic image are warped based on a second look-at point in the three-dimensional scene. The three-dimensional scene may include at least a portion of a virtual object that is not visible from the second left and right focal centers relative to the first view point, and is visible from the second left and right focal centers relative to the first view point. In one embodiment, the first viewpoint is predicted and the second viewpoint is detected.

The control subsystem is further configured for constructing a frame from the left and right warped synthetic images. The virtual image generation subsystem further comprises a display system configured for displaying the frame to the end user. The display system may be configured for being positioned in front of the eyes of the end user. In one embodiment, the display system includes a projection subsystem and a partially transparent display surface, in which case, the projection subsystem may be configured for projecting the frame onto the partially transparent display surface, and the partially transparent display surface may be configured for being position in the field of view between the eyes of the end user and an ambient environment. The virtual image generation system may further comprise a frame structure configured for being worn by the end user, in which case, the frame structure may carry the display system.

Additional and other objects, features, and advantages of the invention are described in the detail description, figures and claims.

BRIEF DESCRIPTION OF THE DRAWINGS

The drawings illustrate the design and utility of preferred embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

The description that follows relates to display systems and methods to be used in virtual reality and/or augmented reality systems. However, it is to be understood that the while the invention lends itself well to applications in virtual reality, the invention, in its broadest aspects, may not be so limited.

Figure 1:
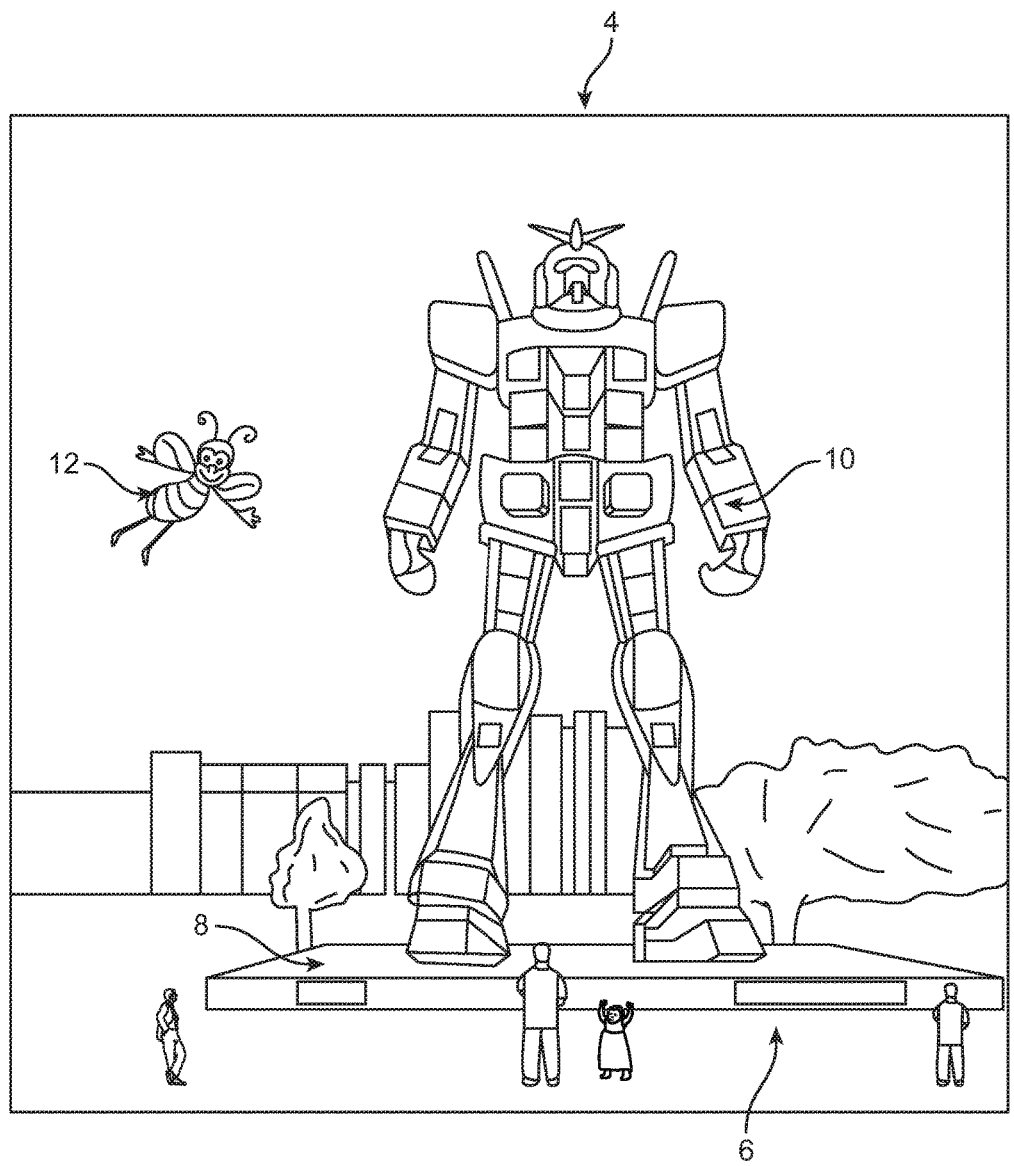
FIG. 1 is a picture of a three-dimensional augmented reality scene that can be displayed to an end user by a prior art augmented reality generation device.
Figure 2:
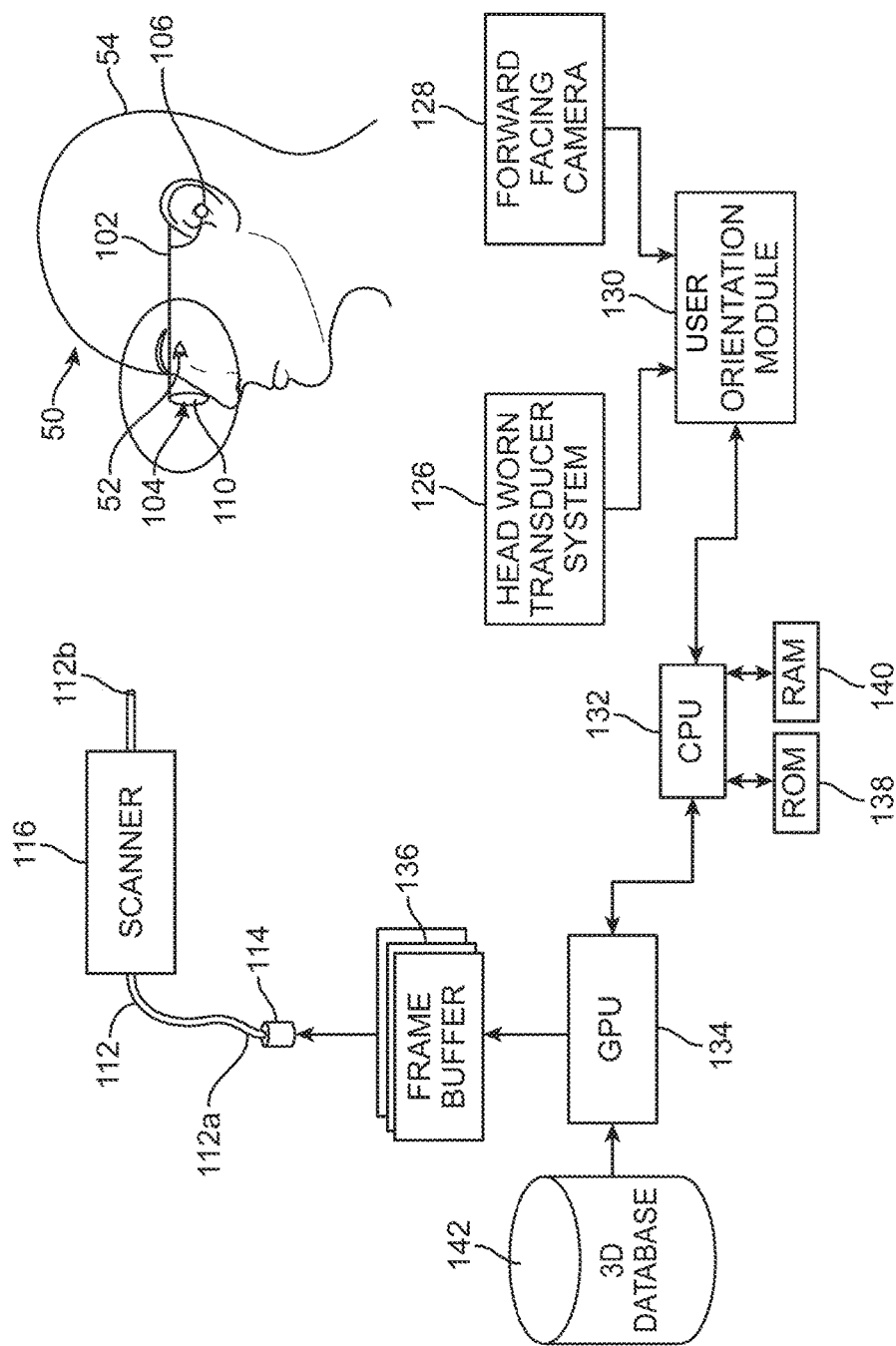
FIG. 2 is a block diagram of a virtual image generation system constructed in accordance with one embodiment of the present inventions.

Referring to FIG. 2, one embodiment of a virtual image generation system 100 constructed in accordance with present inventions will now be described. The virtual image generation system 100 may be operated as an augmented reality system, providing images of virtual objects intermixed with physical objects in a field of view of an end user 50. There are two fundamental approaches when operating the virtual image generation system 100. A first approach employs one or more imagers (e.g., cameras) to capture images of the ambient environment. The virtual image generation system 100 inter-mixes the virtual images into the data representing the images of the ambient environment. A second approach employs one or more at least partially transparent surfaces through which the ambient environment can be seen and on to which the virtual image generation system 100 produces images of virtual objects.

The virtual image generation system 100, and the various techniques taught herein, may be employed in applications other than augmented reality and virtual reality systems. For example, various techniques may be applied to any projection or display system. For example, the various techniques described herein may be applied to pico projectors where movement may be made by an end user's hand rather than the head. Thus, while often described herein in terms of an augmented reality system or virtual reality system, the teachings should not be limited to such systems of such uses.

At least for augmented reality applications, it may be desirable to spatially position various virtual objects relative to respective physical objects in a field of view of the end user 50. Virtual objects, also referred to herein as virtual tags or tag or call outs, may take any of a large variety of forms, basically any variety of data, information, concept, or logical construct capable of being represented as an image. Non-limiting examples of virtual objects may include: a virtual text object, a virtual numeric object, a virtual alphanumeric object, a virtual tag object, a virtual field object, a virtual chart object, a virtual map object, a virtual instrumentation object, or a virtual visual representation of a physical object.

To this end, the virtual image generation system 100 comprises a frame structure 102 worn by an end user 50, a display system 104 carried by the frame structure 102, such that the display system 104 is positioned in front of the eyes 52 of the end user 50, and a speaker 106 carried by the frame structure 102, such that the speaker 106 is positioned adjacent the ear canal of the end user 50 (optionally, another speaker (not shown) is positioned adjacent the other ear canal of the end user 50 to provide for stereo/shapeable sound control). The display system 104 is designed to present the eyes 52 of the end user 50 with photo-based radiation patterns that can be comfortably perceived as augmentations to physical reality, with high-levels of image quality and three-dimensional perception, as well as being capable of presenting two-dimensional content. The display system 104 presents a sequence of frames at high frequency that provides the perception of a single coherent scene.

In the illustrated embodiment, the display system 104 comprises a projection subsystem 108 and a partially transparent display surface 110 on which the projection subsystem 108 projects images. The display surface 110 is positioned in the end user's 50 field of view between the eyes 52 of the end user 50 and an ambient environment. In the illustrated embodiment, the projection subsystem 108 includes one or more optical fibers 112 (e.g. single mode optical fiber), each of which has one end 112a into which light is received and another end 112b from which light is provided to the partially transparent display surface 110. The projection subsystem 108 may also include one or more light sources 114 that produces the light (e.g., emits light of different colors in defined patterns), and communicatively couples the light to the other end 112a of the optical fiber(s) 112. The light source(s) 114 may take any of a large variety of forms, for instance, a set of RGB lasers (e.g., laser diodes capable of outputting red, green, and blue light) operable to respectively produce red, green, and blue coherent collimated light according to defined pixel patterns specified in respective frames of pixel information or data. Laser light provides high color saturation and are highly energy efficient.

Figure 3:
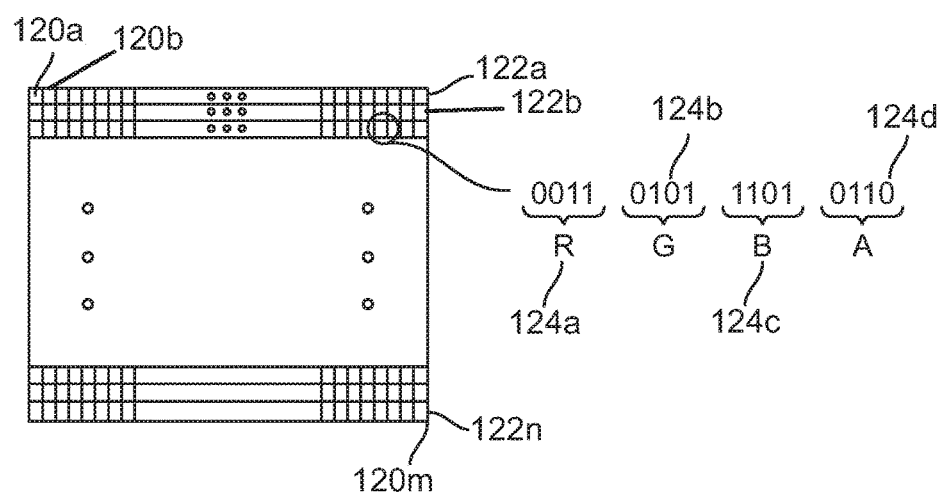
FIG. 3 is a plan view of an exemplary frame generated by the virtual image generation system of FIG. 2.
Figure 4A:
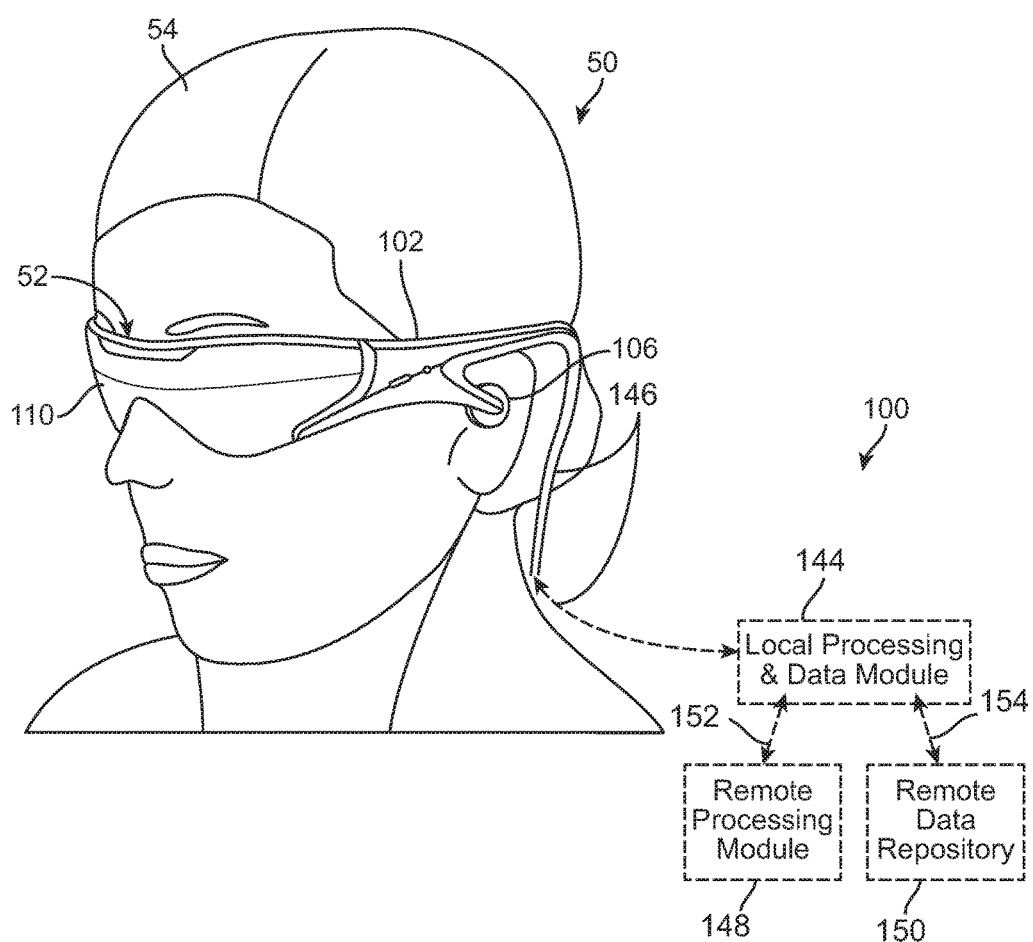
FIG. 4A is a view of one technique that can be used to wear the virtual image generation system of FIG. 2.
Figure 4B:
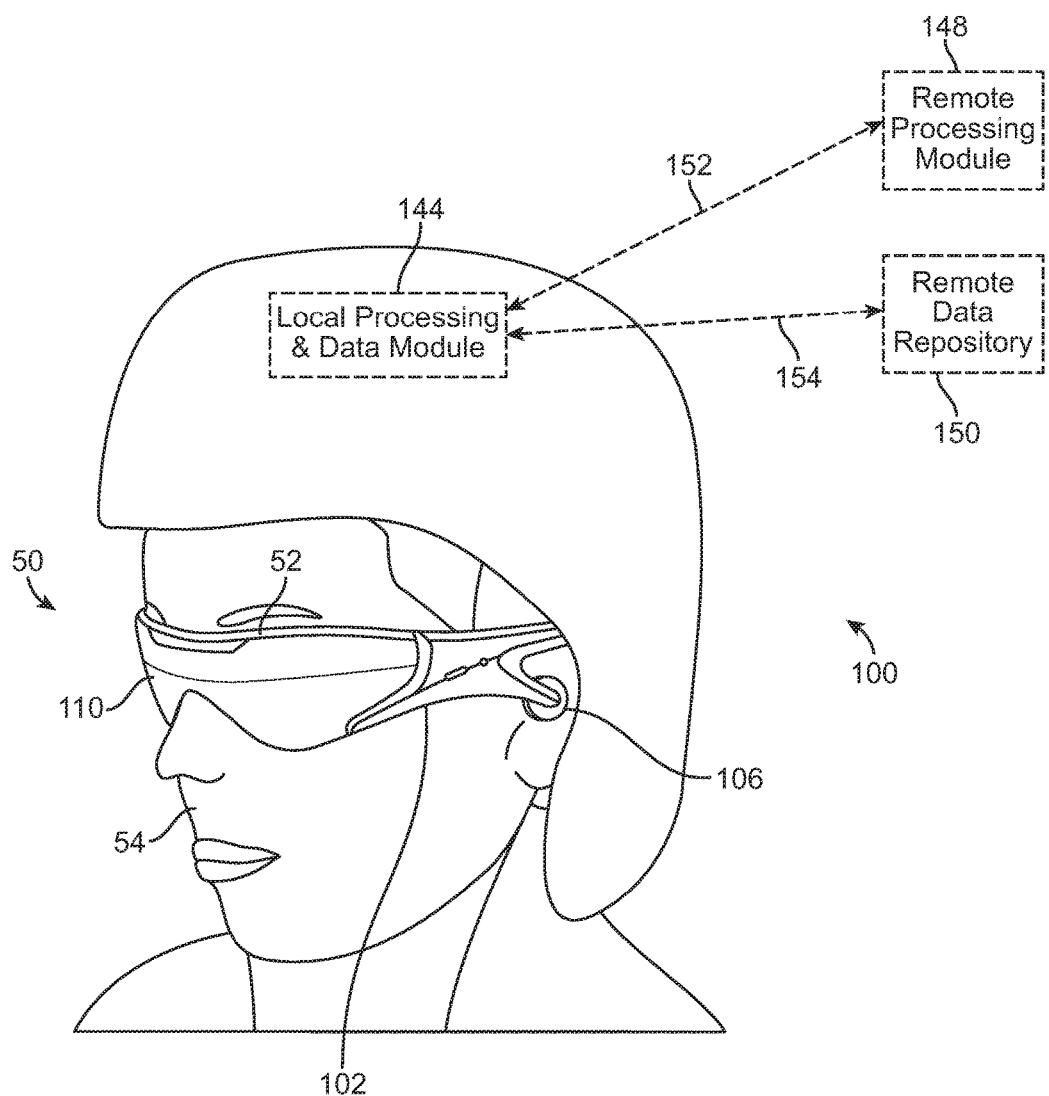
FIG. 4B is a view of another technique that can be used to wear the virtual image generation system of FIG. 2.
Figure 4C:
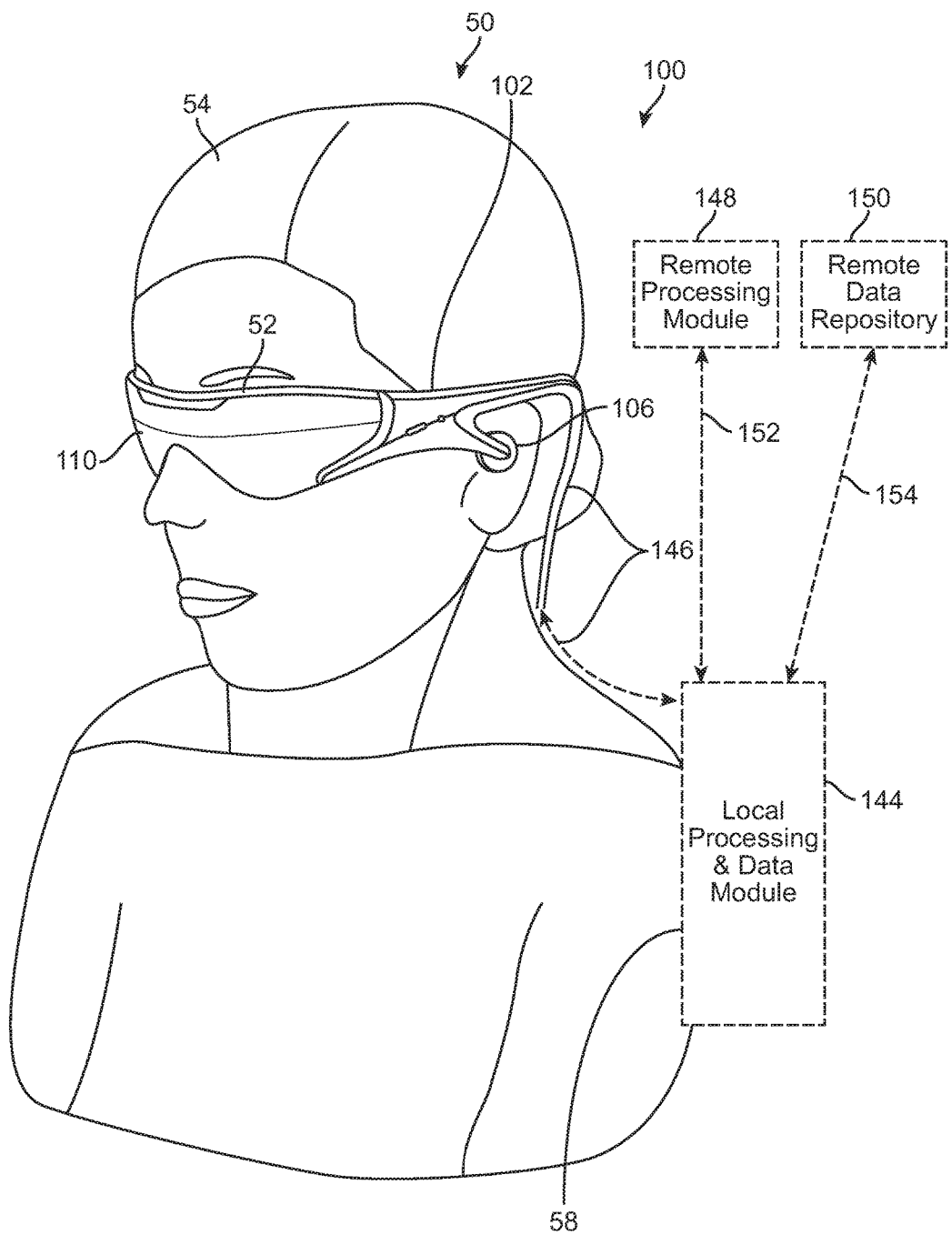
FIG. 4C is a view of still another one technique that can be used to wear the virtual image generation system of FIG. 2.
Figure 4D:
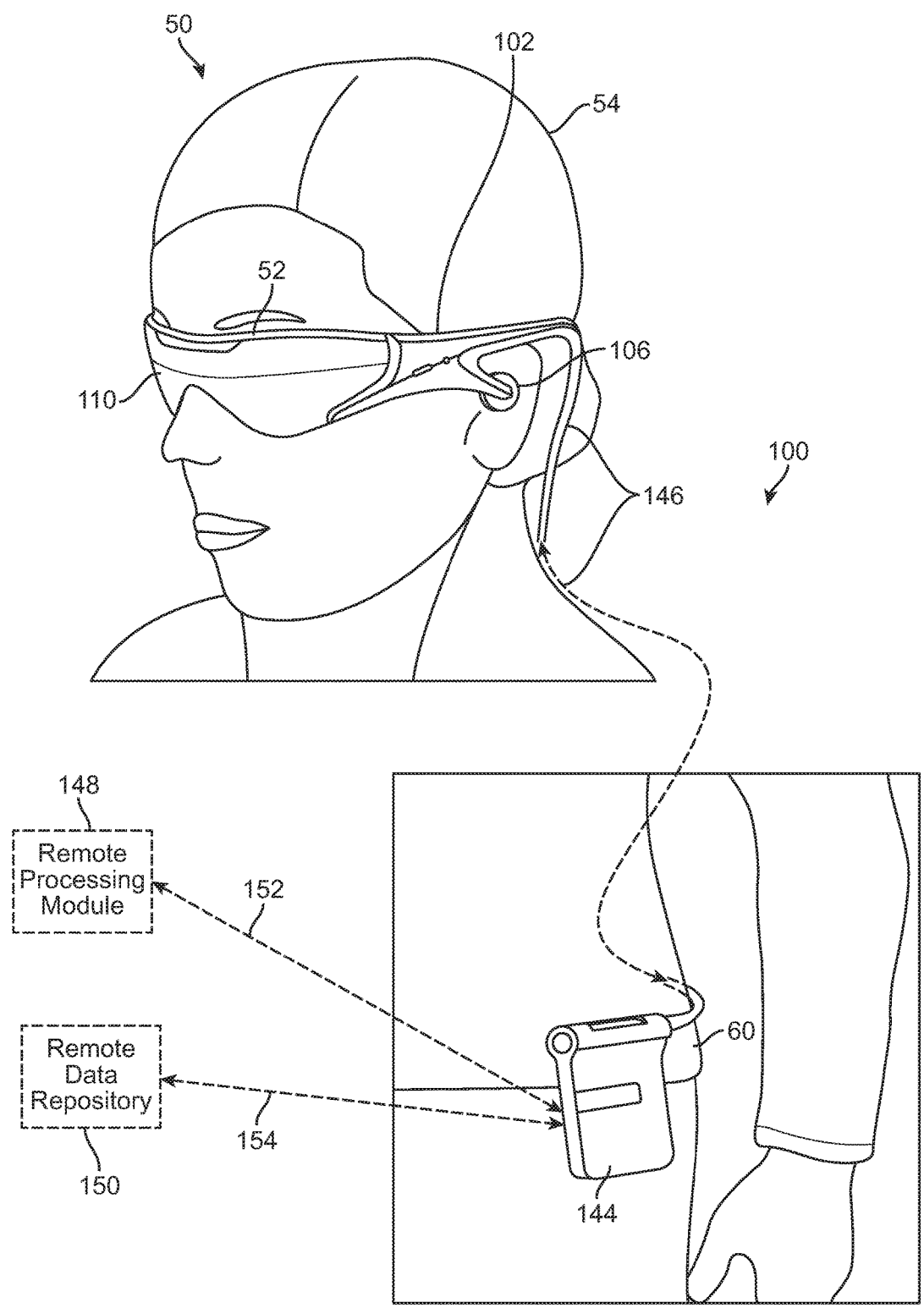
FIG. 4D is a view of yet another one technique that can be used to wear the virtual image generation system of FIG. 2.

The display system 104 may further comprise a scanning device 116 that scans the optical fiber(s) 112 in a predetermined pattern in response to control signals. For example, referring to FIG. 3, a frame 118 of pixel information or data specifies pixel information or data to present an image, for example, an image of one or more virtual objects, according to one illustrated embodiment. The frame 118 is schematically illustrated with cells 120a-120m divided into horizontal rows or lines 122a-122n. Each cell 120 of the frame 118 may specify values for each of a plurality of colors for the respective pixel to which the cell 120 corresponds and/or intensities. For instance, the frame 118 may specify one or more values for red 124a, one or more values for green 124b, and one or more values for blue 124c for each pixel. The values 124 may be specified as binary representations for each of the colors, for instance, a respective 4-bit number for each color. Each cell 120 of the frame 118 may additionally include a value 124d that specifies an amplitude. Further details explaining an example of a display system 104 are provided in U.S. Provisional Patent Application Ser. No. 61/801,219, which is expressly incorporated herein by reference.

Referring back to FIG. 2, the virtual image generation system 100 further comprises one or more sensors (not shown) mounted to the frame structure 102 for detecting the position and movement of the head 54 of the end user 50 and/or the eye position and inter-ocular distance of the end user 50. Such sensor(s) may include image capture devices (such as cameras), microphones, inertial measurement units, accelerometers, compasses, GPS units, radio devices, and/or gyros).

For example, in one embodiment, the virtual image generation system 100 comprises a head worn transducer system 126 that includes one or more inertial transducers to capture inertial measures indicative of movement of the head 54 of the end user 50. Such may be used to sense, measure, or collect information about the head movements of the end user 50. For instance, such may be used to detect measurement movements, speeds, acceleration, and/or positions of the head 54 of the end user 50. The virtual image generation system 100 may further comprise a forward facing camera 128. Such may be used to capture information about the environment in which the end user 50 is located. Such may be used to capture information indicative of distance and orientation of the end user 50 with respect to that environment and specific objects in that environment. When head worn, the forward facing camera 128 is particularly suited to capture information indicative of distance and orientation of the head 54 of the end user 50 with respect to the environment in which the end user 50 is located and specific objects in that environment. Such may, for example, be employed to detect head movement, speed, and/or acceleration of head movements. Such may, for example, be employed to detect or infer a center of attention of the end user 50, for example, based at least in part on an orientation of the head 54 of the end user 50. Orientation may be detected in any direction (e.g., up/down, left, right with respect to the reference frame of the end user 50).

The virtual image generation system 100 further comprises a user orientation detection module 130. The user orientation module 130 detects the instantaneous position of the head 54 of the end user 50 and predicts the position of the head 54 of the end user 50 based on position data received from the sensor(s). In one embodiment, the user orientation module 130 predicts the position of the head 54 based on predicting the end user's 50 shift in focus. For example, the user orientation module 130 may select a virtual object based at least on input indicative of attention of the end user 50, and determine the location of appearance of a virtual object in a field of view of the end user 50 relative to the frame of reference of the end user 50. As another example, the user orientation module 130 may employ estimated speed and/or estimated changes in speed or estimated acceleration to predict the position of the head 54 of the end user 50. As still another example, the user orientation module 130 may employ historical attributes of the end user 50 to predict the position of the head 54 of the end user 50. Further details describing predicting the head position of an end user 50 are set forth in U.S. Patent Application Ser. No. 61/801,219, which has previously been incorporated herein by reference.

The virtual image generation system 100 further comprises a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs).

In the illustrated embodiment, the virtual image generation system 100 comprises a central processing unit (CPU) 132, a graphics processing unit (GPU) 134, and one or more frame buffers 136. The CPU 132 controls overall operation, while the GPU 134 renders frames (i.e., translating a three-dimensional scene into a two-dimensional image) from three-dimensional data stored in the remote data repository 150 and stores these frames in the frame buffer(s) 136. While not illustrated, one or more additional integrated circuits may control the reading into and/or reading out of frames from the frame buffer(s) 136 and operation of the scanning device of the display system 104. Reading into and/or out of the frame buffer(s) 146 may employ dynamic addressing, for instance, where frames are over-rendered. The virtual image generation system 100 further comprises a read only memory (ROM) 138 and a random access memory (RAM) 140. The virtual image generation system 100 further comprises a three-dimensional data base 142 from which the GPU 134 can access three-dimensional data of one or more scenes for rendering frames.

The various processing components of the virtual image generation system 100 may be physically contained in a distributed system. For example, as illustrated in FIGS. 4A-4D, the virtual image generation system 100 comprises a local processing and data module 144 operatively coupled, such as by a wired lead or wireless connectivity 146, to the display system 104 and sensors. The local processing and data module 144 may be mounted in a variety of configurations, such as fixedly attached to the frame structure 102 (FIG. 2A), fixedly attached to a helmet or hat 56 (FIG. 2B), embedded in headphones, removably attached to the torso 58 of the end user 50 (FIG. 2C), or removably attached to the hip 60 of the end user 50 in a belt-coupling style configuration (FIG. 2D). The virtual image generation system 100 further comprises a remote processing module 148 and remote data repository 150 operatively coupled, such as by a wired lead or wireless connectivity 150, 152, to the local processing and data module 144, such that these remote modules 148, 150 are operatively coupled to each other and available as resources to the local processing and data module 144.

The local processing and data module 144 may comprise a power-efficient processor or controller, as well as digital memory, such as flash memory, both of which may be utilized to assist in the processing, caching, and storage of data captured from the sensors and/or acquired and/or processed using the remote processing module 148 and/or remote data repository 150, possibly for passage to the display system 104 after such processing or retrieval. The remote processing module 148 may comprise one or more relatively powerful processors or controllers configured to analyze and process data and/or image information. The remote data repository 150 may comprise a relatively large-scale digital data storage facility, which may be available through the internet or other networking configuration in a "cloud" resource configuration. In one embodiment, all data is stored and all computation is performed in the local processing and data module 144, allowing fully autonomous use from any remote modules.

The couplings 146, 152, 154 between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless. In still further implementations, the choice of wired and wireless communications may be different from that illustrated in FIGS. 4A-4D. Thus, the particular choice of wired or wireless communications should not be considered limiting.

In the illustrated embodiment, the user orientation module 130 is contained in the local processing and data module 144, while CPU 132 and GPU 134 are contained in the remote processing module 148, although in alternative embodiments, the CPU 132, GPU 124, or portions thereof may be contained in the local processing and data module 144. The 3D database 142 can be associated with the remote data repository 150.

Significant to the present inventions, the GPU 134, based on the head position and head movements of the end user 50 obtained from the transducer system 126 via the local processing and data module 144, renders and warps frames in a manner that minimizes latency (i.e., the elapsed time between when the end user 50 moves his or her head and the time when the frame is updated and displayed to the end user 50), while also reducing the frequency and size of holes in the warped images.

Figure 5:
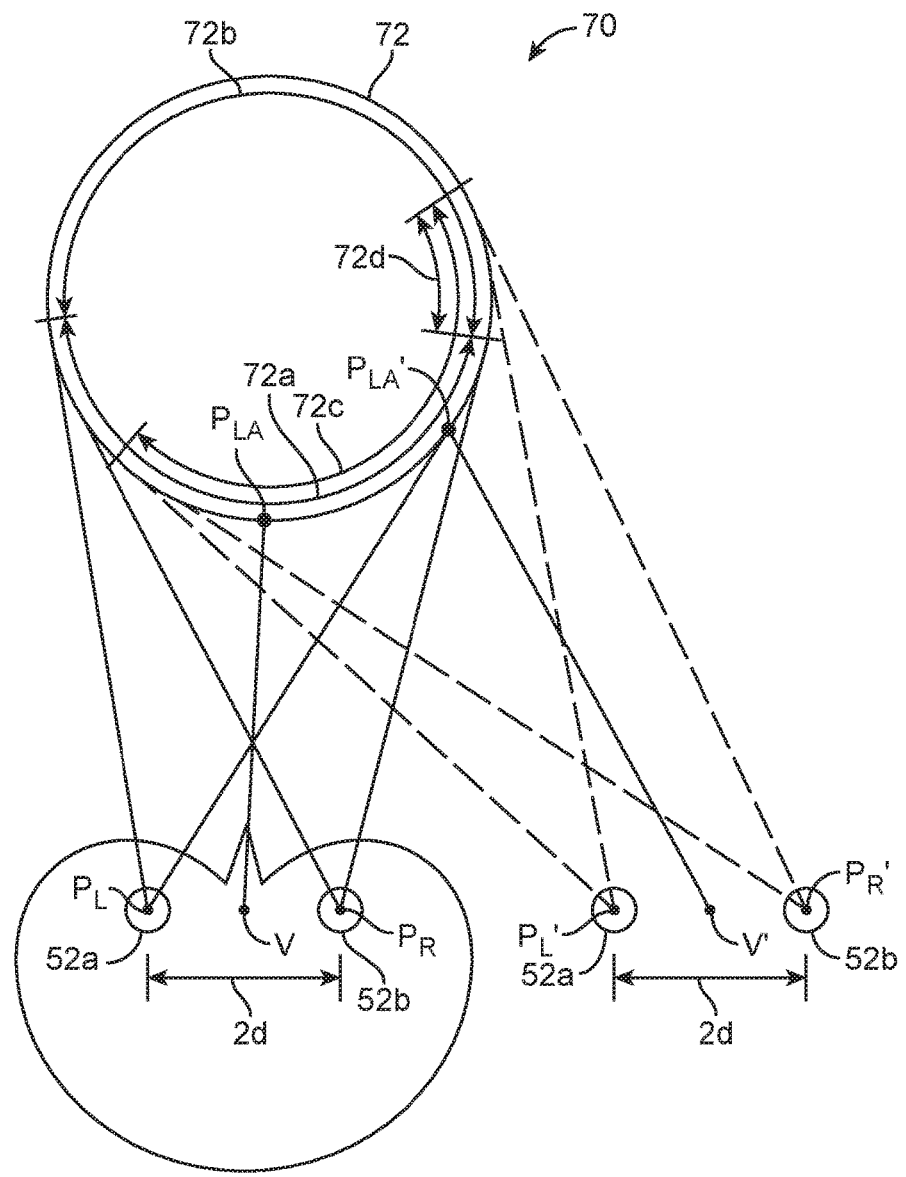
FIG. 5 is a diagram illustrating a baseline view of a three-dimensional virtual object when rendered from left and right focal centers aligned with the inter-ocular distance of an end user compared to a view of the three-dimensional virtual object warped to same left and right focal centers after the head of the end user has moved.

In particular, and with reference to FIG. 5, consider that the end user 50 has ocular focal centers at positions $P_L(x, y, z)=(-d, 0, 0)$ and $P_R(x, y, z)=(d, 0, 0)$ relative to a viewpoint $V(x, y, z)=(0, 0, 0)$, where x, y, and z are the coordinates in three-dimensional space in which a three-dimensional scene 70 exists. The nominal inter-ocular distance of the end user 50 will then be $2d$. In the prior art, assuming that the left and right eyes 52a, 52b are pointed to a look-at point $P_{LA}$, a synthetic image $I_L(u, v)$ and depth buffer $D_L(u, v)$ of the three-dimensional scene 70 can be constructed from the focal point $P_L(x, y, z)$, and a synthetic image $I_R(u, v)$ and depth buffer $D_R(u, v)$ of the three-dimensional scene 70 can be constructed from the focal point $P_R(x, y, z)$, where u and v are the coordinates of the pixels in the synthetic images. Assuming that the head position of the end user 50 changes, such that the viewpoint changes from the position V to the position V', the left eye 52a is now located at a new focal point $P_L'(x, y, z)$, and the right eye 52b is now located at a new focal point $P_R'(x, y, z)$, which are now pointed to a different look-at point $P_{LA}'$. In the prior art, the synthetic images $I_L(u, v)$ and $I_R(u, v)$ are two-dimensionally warped using parallax in a conventional manner, using the depth buffers $D_L(u, v)$ and $D_R(u, v)$, and the old and new look-at points $P_{LA}'$ and $P_{LA}$, to create new synthetic images $I_L'(u, v)$ and $I_R'(u, v)$ of the three-dimensional scene 70 for new focal points $P_L'(x, y, z)$ and $P_R'(x, y, z)$.

Because the image points move different amounts, depending on their depth, points in the three-dimensional scene 70 not visible from the old focal points $P_L(x, y, z)$ and $P_R(x, y, z)$ may be visible from new focal points $P_L'(x, y, z)$ and $P_R'(x, y, z)$. These points (the disoccluded points) are problematic, because they create "holes" in the newly warped synthetic images $I_L'(u, v)$ and $I_R'(u, v)$. All existing methods of filling those holes are computationally expensive and/or potentially create artifacts. For example, consider a convex object, such as a sphere 72, in the three-dimensional scene 70 illustrated in FIG. 5. A relatively small portion 72a of the sphere 72 is visible from the old focal points $P_L(x, y, z)$ and $P_R(x, y, z)$, while a relatively large portion 72b of the sphere 72 remains invisible from the old focal points $P_L(x, y, z)$ and $P_R(x, y, z)$. However, a different portion 72c of the sphere 72 is visible from the new focal points $P_L'(x, y, z)$ and $P_R'(x, y, z)$, some 72d of which is included in the relatively large portion 72b of the sphere 72 invisible from the old focal points $P_L(x, y, z)$ and $P_R(x, y, z)$. That is, the portion 72d of the sphere 72 has been disoccluded when the eyes are moved from the old focal points $P_L(x, y, z)$ and $P_R(x, y, z)$ to the new focal points $P_L'(x, y, z)$ and $P_R'(x, y, z)$.

Figure 6:
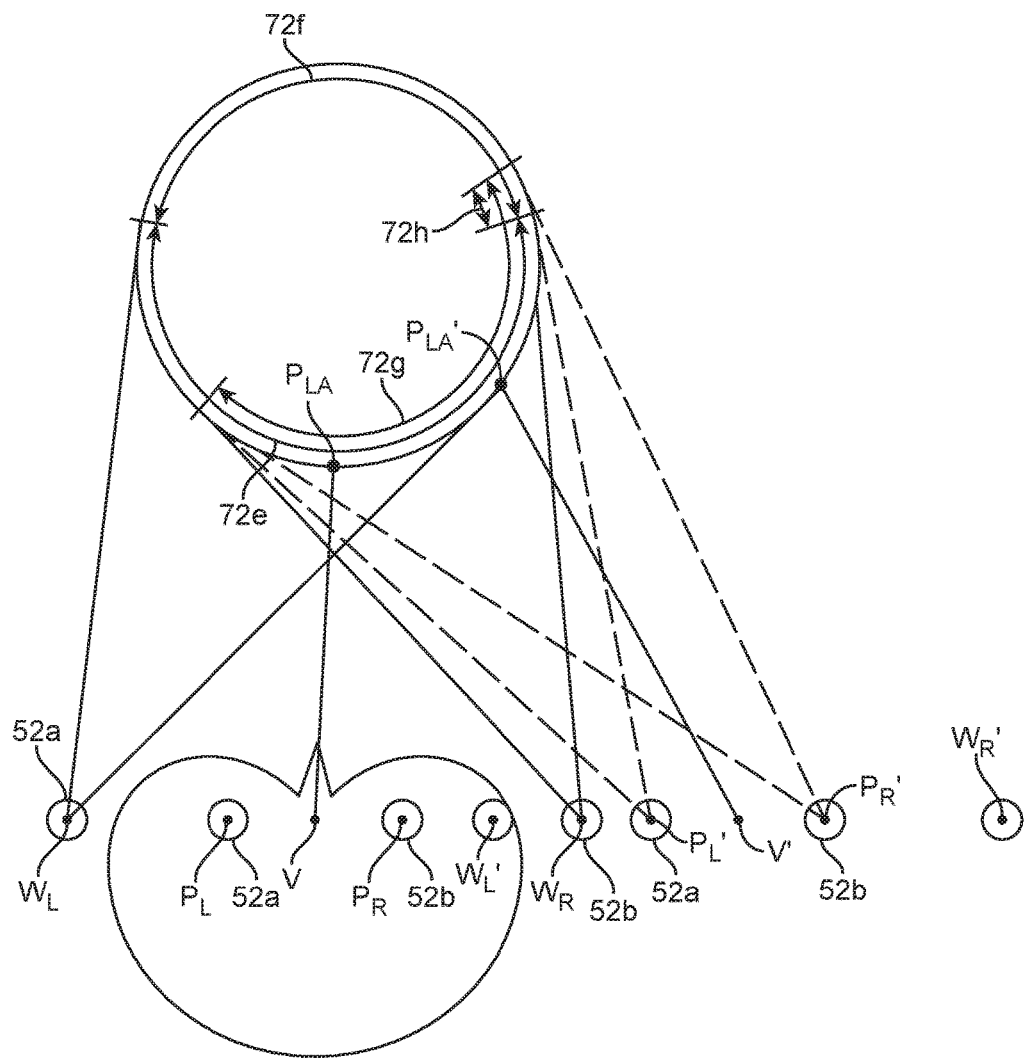
FIG. 6 is a diagram illustrating a baseline view of a three-dimensional virtual object when rendered from left and right focal centers spaced a distance greater than the inter-ocular distance of an end user compared to a view of the three-dimensional virtual object warped to left and right focal centers aligned with the inter-ocular distance of the end user after the head of the end user has moved.

With reference to FIG. 6, in one embodiment of the present inventions, assuming that the left and right eyes 52a, 52b are pointed to a look-at point $P_{LA}$, a synthetic image $I_L(u, v)$ and depth buffer $D_L(u, v)$ of the three-dimensional scene 70 are initially constructed from the focal point $W_L(x, y, z)$, and a synthetic image $I_R(u, v)$ and depth buffer $D_R(u, v)$ of the three-dimensional scene 70 are initially constructed from the focal point $W_R(x, y, z)$ relative to the viewpoint $V(x, y, z)=(0, 0, 0)$.

The focal points $W_L(x, y, z)$ and $W_R(x, y, z)$ are spaced from each other a wider rendering distance greater than the inter-ocular distance of the end user 50 (in the exemplary case, greater than $2d$). For example, the focal points $W_L(x, y, z)$ and $W_R(x, y, z)$ can be selected in accordance with the equations:

$$W_L(x, y, z) = P_R(x, y, z) + k(P_L(x, y, z) - P_R(x, y, z)); \text{ and} \quad [1]$$

$$W_R(x, y, z) = P_L(x, y, z) + k(P_R(x, y, z) - P_L(x, y, z)); \quad [2]$$

where k>1 to set the spacing between the focal points $W_L(x, y, z)$ and $W_R(x, y, z)$ to be greater than the inter-ocular distance of the end user 50. The values for the focal points $W_L(x, y, z)$ and $W_R(x, y, z)$ can be selected to compromise between minimizing the size and number of holes in the synthetic image and the overall quality of the synthetic image. That is, the size and number of the holes in the synthetic image will decrease as the distance between the focal points $W_L(x, y, z)$ and $W_R(x, y, z)$ increases; however, the general quality of the synthetic image will decrease as the distance between the focal points $W_L(x, y, z)$ and $W_R(x, y, z)$ increases.

Assuming again that the head position of the end user 50 changes, such that the viewpoint changes from the position V to the position V', the left eye 52a is now located at a new focal point $P_L'(x, y, z)$, and the right eye 52b is now located at a new focal point $P_R'(x, y, z)$, which are now pointed to the different look-at point $P_{LA}'$. The synthetic images $I_L(u, v)$ and $I_R(u, v)$ are two-dimensionally warped using parallax in a conventional manner, using the depth buffers $D_L(u, v)$ and $D_R(u, v)$, and the old and new look-at points $P_{LA}'$ and $P_{LA}$, to create new synthetic images $I_L'(u, v)$ and $I_R'(u, v)$ of the three-dimensional scene 70 for new focal points $P_L'(x, y, z)$ and $P_R'(x, y, z)$.

Significantly, a larger portion 72e of the sphere 72 is visible from old focal points $W_L(x, y, z)$ and $W_R(x, y, z)$ compared to the portion 72a of the sphere 72 seen from old focal points $P_L(x, y, z)$ and $P_R(x, y, z)$, while a smaller portion 72f of the sphere 72 remains invisible from the old focal points $W_L(x, y, z)$ and $W_R(x, y, z)$ compared to the portion 72b of the sphere 72 invisible from old focal points $P_L(x, y, z)$ and $P_R(x, y, z)$. As such, the locus of sphere points visible from focal points $W_L(x, y, z)$ and $W_R(x, y, z)$ is greater than the locus of sphere points from focal points $P_L(x, y, z)$ and $P_R(x, y, z)$. As a result, when looking at convex points, it will be expected that fewer and smaller holes exist after a two-dimensional image warp used to compute new images $I_L'(u, v)$ and $I_R'(u, v)$ of the three-dimensional scene 70 for new focal points $W_L(x, y, z)$ and $W_R(x, y, z)$. For example, a different portion 72g of the sphere 72 is visible from the new focal points $P_L'(x, y, z)$ and $P_R'(x, y, z)$, some 72h of which is included in the relatively large portion 72f of the sphere 72 invisible from the old focal points $P_L(x, y, z)$ and $P_R(x, y, z)$. That is, a smaller portion 72h of the sphere 72 compared to the portion 72d of the sphere 72 has been disoccluded when the eyes are moved from the old focal points $P_L(x, y, z)$ and $P_R(x, y, z)$ to the new focal points $P_L'(x, y, z)$ and $P_R'(x, y, z)$.

Figure 7:
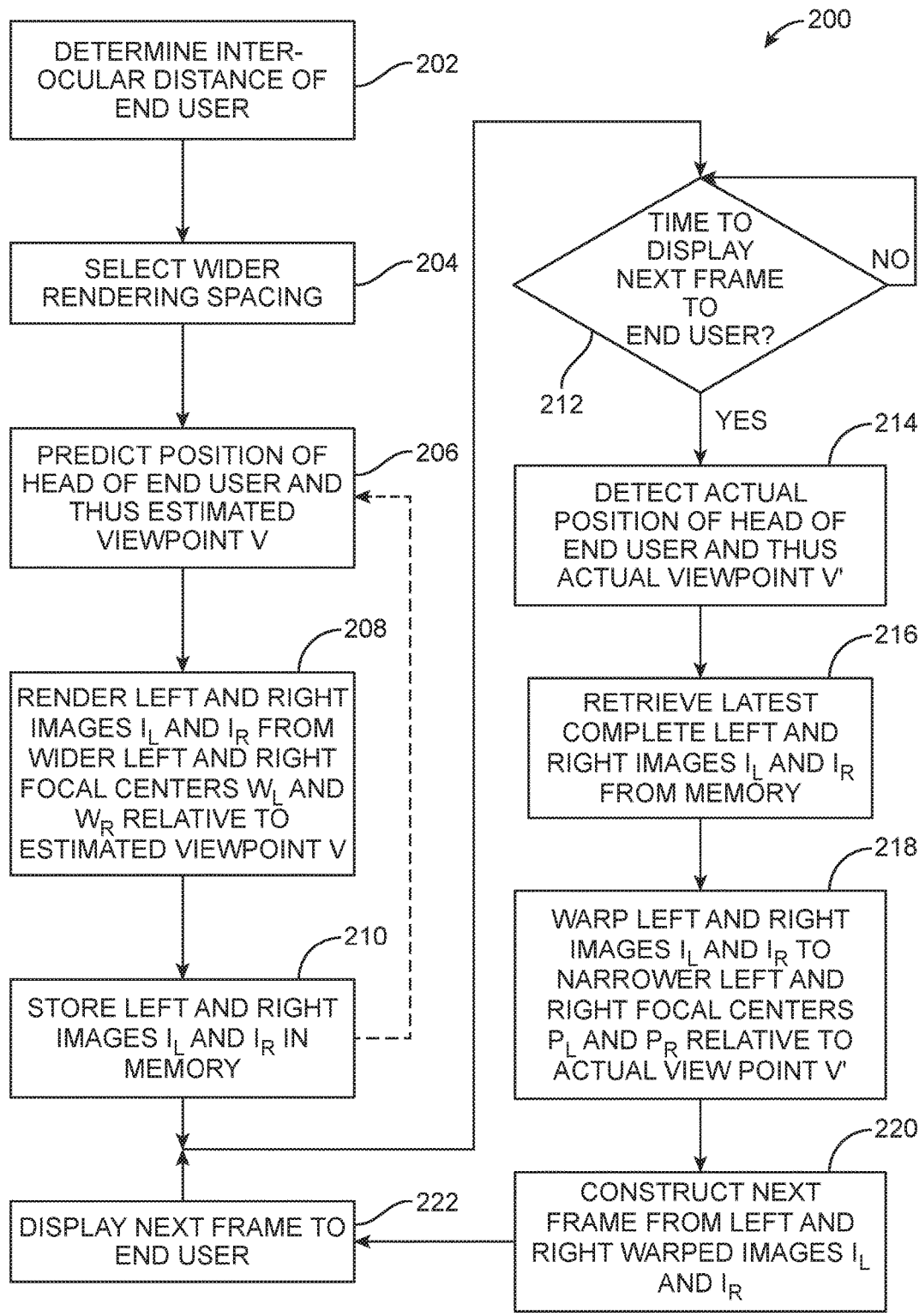
FIG. 7 is a flow diagram illustrated one method of operating the virtual image generation system of FIG. 2 to render and warp images.

Referring now to FIG. 7, one method 200 of operating the virtual image generation system 100 to display AR image frames to the end user 50 will be described. First, the CPU 132 determines the inter-ocular distance (i.e., the difference between the focal points $P_L(x, y, z)$ and $P_R(x, y, z)$) of the end user 50 (step 202). The inter-ocular distance of the end user 50 may be detected, such as rearward facing cameras mounted to the frame structure 102. Alternatively, the inter-ocular distance of the end user 50 may be manually entered into the virtual image generation system 100.

Next, the CPU 132 selects the wider rendering spacing (i.e., the difference between the focal points $W_L(x, y, z)$ and $W_R(x, y, z)$) (step 204). For example, the wider rendering spacing may be manually entered into the virtual image generation system 100. The wider rendering spacing may be selected in accordance with equations [1] and [2].

In the method illustrated in FIG. 7, frames are displayed to the end user 50 at a rate greater than the rate at which the images of the three-dimensional scene 70 may be rendered in order to minimize latency; that is, the elapsed time between when the end user 50 moves his or her head and the time when the frame is updated and displayed to the end user 50. For example, if the maximum rate at which the frames are rendered is once every 15 ms, the frames may be displayed to the end user 50 once every 5 ms. In this case, for each image that is rendered, three frames can be displayed to the end user 50.

Accordingly, the CPU 132 instructs the user orientation module 130, using the associated head worn transducer system 126 and forward facing camera 128, to predict an estimated position of the head 54 of the end user 50, and thus an estimated viewpoint V, at the next time that a frame is to be displayed to the end user 50 (step 206). The predication of the position of the head 54 may be derived from the immediately previous detected actual position of the head 54 and other parameters, such as speed, acceleration, and historical attributes of the end user 50. The CPU 132, then, instructs the GPU 134 to render the left and right synthetic images $I_L(u, v)$ and $I_R(u, v)$ of the three-dimensional scene 70 respectively from the wider left and right focal centers $W_L(x, y, z)$ and $W_R(x, y, z)$ relative to the estimated viewpoint V (step 208). In the preferred method, the left and right synthetic images $I_L(u, v)$ and $I_R(u, v)$ are rendered in three dimensions, and may be rendered based on a look-at point $P_{LA}$ in the three-dimensional scene 70. The CPU 132 then stores the left and right synthetic images $I_L(u, v)$ and $I_R(u, v)$ in memory (step 210). Steps 206-210 are repeated to continually render and store the left and right synthetic images $I_L(u, v)$ and $I_R(u, v)$ at each estimated position of the head 54.

As the GPU 134 renders and stores these images, the CPU 132 determines whether it is time to display the next frame to the end user 50 (step 212). If so, the CPU 132 instructs the user orientation module 130, using the associated head worn transducer system 126 and forward facing camera 128, to detect the actual position of the head 54 of the end user 50, and thus the actual viewpoint V' (step 214).

The CPU 132 then instructs the GPU 134 to retrieve the most recent complete left and right synthetic images $I_L(u, v)$ and $I_R(u, v)$ rendered at the wider left and right focal centers $W_L(x, y, z)$ and $W_R(x, y, z)$ from the memory (step 216), and to warp the retrieved left and right synthetic images $I_L(u, v)$ and $I_R(u, v)$ respectively to the narrower left and right focal centers $P_L'(x, y, z)$ and $P_R'(x, y, z)$ relative to the actual viewpoint V' (step 218). In the preferred method, the left and right synthetic images $I_L(u, v)$ and $I_R(u, v)$ are warped in two dimensions, and may be rendered based on a different look-at point $P_{LA}'$ in the three-dimensional scene. The left and right synthetic images $I_L(u, v)$ and $I_R(u, v)$ may be warped using left depth data and right depth data generated during the rendering of the left and right synthetic images $I_L(u, v)$ and $I_R(u, v)$. The CPU 132 then instructs the GPU 134 to construct a frame from the left and right warped synthetic images $I_L'(u, v)$ and $I_R'(u, v)$ (step 220), and then instructs the display system 104 to display the frame to the end user 50 (step 222). The CPU 132 returns to step 212 to periodically determine whether it is time to display the next frame to the end user 50.

Figure 8:
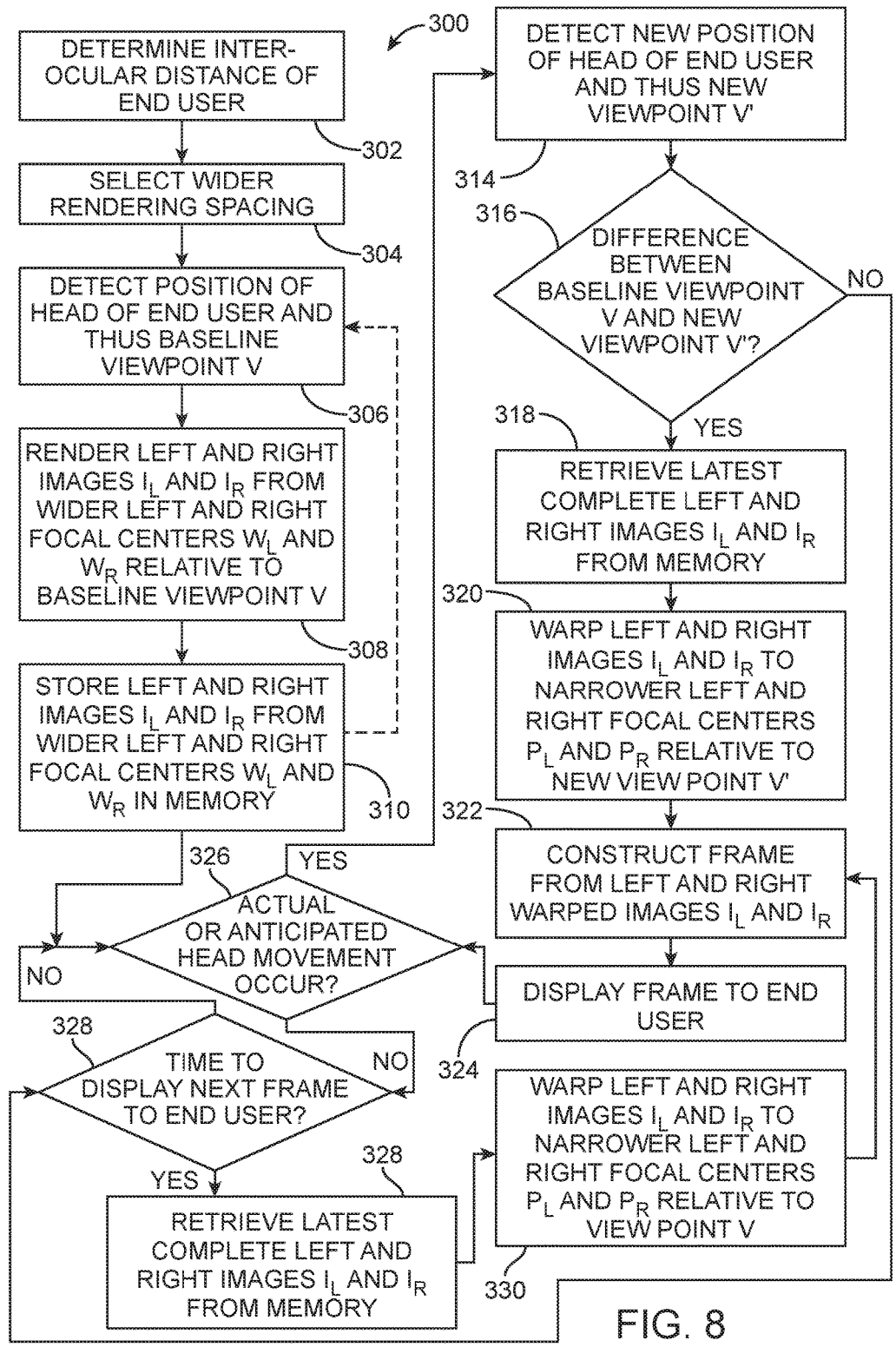
FIG. 8 is a flow diagram illustrated another method of operating the virtual image generation system of FIG. 2 to render and warp images.

Referring now to FIG. 8, another method 300 of operating the virtual image generation system 100 to display AR image frames to an end user 50 will be described. The method 300 generally differs from the method 200 in that frames are only displayed at a rate greater than that at which the images of the three-dimensional scene 70 when the end user 50 moves his or her head 54. For example, if the maximum rate at which the frames are rendered is once every 15 ms, the frames may be displayed to the end user 50 once every 15 ms when the head 54 of the end user 50 is stable, and may be displayed to the end user 50 once every 5 ms when the head 54 of the end user 50 is moving.

To this end, the CPU 132 determines the inter-ocular distance of the end user 50 (step 302), and selects the wider rendering spacing (step 304), which can be accomplished in the manner described above with respect to steps 202 and 204 of the method 200. Next, the CPU 132 instructs the user orientation module 130, using the associated head worn transducer system 126 and forward facing camera 128, to detect the actual position of the head 54 of the end user 50, and thus a baseline viewpoint V (step 306). The CPU 132, then, instructs the GPU 134 to render the left and right synthetic images $I_L(u, v)$ and $I_R(u, v)$ of the three-dimensional scene 70 respectively from the wider left and right focal centers $W_L(x, y, z)$ and $W_R(x, y, z)$ relative to the baseline viewpoint V (step 308). In the preferred method, the left and right synthetic images $I_L(u, v)$ and $I_R(u, v)$ are rendered in three dimensions, and may be rendered based on a look-at point $P_{LA}$ in the three-dimensional scene 70. The CPU 132 then stores the left and right synthetic images $I_L(u, v)$ and $I_R(u, v)$ in memory (step 310). Steps 306-310 are repeated to continually render and store the left and right synthetic images $I_L(u, v)$ and $I_R(u, v)$.

As the GPU 134 renders and stores these images, the CPU 132 instructs the user orientation module 130, using the associated head worn transducer system 126 and forward facing camera 128, to determine whether an actual and anticipated movement of the head 54 of the end user 50 occurs (step 312). If actual or anticipated movement does occur, the CPU 132 instructs the user orientation module 130, using the associated head worn transducer system 126 and forward facing camera 128, to detect the new position of the head 54 of the end user 50, and thus the new viewpoint V' (step 314).

Next, the CPU 132 determines whether there is a substantive difference between the baseline viewpoint V and the new view point V' (step 316). If there is a substantive difference between the baseline viewpoint V and the new view point V', the CPU 132 instructs the GPU 134 to retrieve the most recent complete left and right synthetic images $I_L(u, v)$ and $I_R(u, v)$ rendered at the wider left and right focal centers $W_L(x, y, z)$ and $W_R(x, y, z)$ (step 318), and to warp the retrieved left and right synthetic images $I_L(u, v)$ and $I_R(u, v)$ respectively to the narrower left and right focal centers $P_L'(x, y, z)$ and $P_R'(x, y, z)$ relative to the actual viewpoint V' (step 320). In the preferred method, the left and right synthetic images $I_L(u, v)$ and $I_R(u, v)$ are warped in two dimensions, and may be rendered based on a different look-at point $P_{LA}'$ in the three-dimensional scene. The left and right synthetic images $I_L(u, v)$ and $I_R(u, v)$ may be warped using left depth data and right depth data generated during the rendering of the left and right synthetic images $I_L(u, v)$ and $I_R(u, v)$. The CPU 132 then instructs the GPU 134 to construct a frame from the left and right warped synthetic images $I_L'(u, v)$ and $I_R'(u, v)$ (step 320), and then instructs the display system 104 to display the frame to the end user 50 (step 324).

If at step 312 there was a determination that no actual or anticipated movement of the head 54 of the user 50 occurs, or if at step 316 there was a determination that there is no substantive difference between the baseline viewpoint V and the new viewpoint V', the CPU 132 determines whether it is time to display the next frame to the end user 50 (step 226). If so, the CPU 132 then instructs the GPU 134 to retrieve the most recent complete left and right synthetic images $I_L(u, v)$ and $I_R(u, v)$ rendered at the wider left and right focal centers $W_L(x, y, z)$ and $W_R(x, y, z)$ from the memory (step 328), and to warp the retrieved left and right synthetic images $I_L(u, v)$ and $I_R(u, v)$ respectively to the narrower left and right focal centers $P_L'(x, y, z)$ and $P_R'(x, y, z)$ relative to the baseline viewpoint V (step 330). In the preferred method, the left and right synthetic images $I_L(u, v)$ and $I_R(u, v)$ are warped in two dimensions, and may be rendered based on a different look-at point $P_{LA}'$ in the three-dimensional scene. The left and right synthetic images $I_L(u, v)$ and $I_R(u, v)$ may be warped using left depth data and right depth data generated during the rendering of the left and right synthetic images $I_L(u, v)$ and $I_R(u, v)$. The CPU 132 then instructs the GPU 134 to construct a frame from the left and right warped synthetic images $I_L'(u, v)$ and $I_R'(u, v)$ (step 322), and then instructs the display system 104 to display the frame to the end user 50 (step 324). The CPU 132 returns to step 326 to determine whether actual or anticipated movement of the head 54 of the end user 50 has moved.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method of operating a virtual image generation system, the method comprising:

rendering a left synthetic image and a right synthetic image of a three-dimensional scene respectively from a first left focal center and a first right focal center relative to a first head pose of an end user, the first left and first right focal centers being spaced from each other a distance greater than an inter-ocular distance of the end user;

warping the left synthetic image and the right synthetic image respectively to a second left focal center and a second right focal center relative to a second head pose of the end user different from the first head pose of the end user, the second left and right focal centers spaced from each other a distance equal to the inter-ocular distance of the end user;

constructing a frame from the left and right warped synthetic images;

displaying the frame to the end user.

2. The method of claim 1, wherein the left and right synthetic images are rendered in three dimensions and warped in two dimensions.

3. The method of claim 1, further comprising generating left depth data and right depth data respectively for the left synthetic image and right synthetic image, wherein the left synthetic image and the right synthetic image are respectively warped using parallax using the left depth data and the right depth data.

4. The method of claim 3, wherein the left synthetic image and the right synthetic image are rendered based on a first look-at point in the three-dimensional scene, and the left synthetic image and the right synthetic image are warped based on the first look-at point in the three-dimensional scene and a second look-at point in the three-dimensional scene.

5. The method of claim 1, further comprising detecting the inter-ocular distance of the user.

6. The method of claim 1, further comprising predicting an estimate of the first head pose and detecting the second head pose.

7. The method of claim 1, further comprising detecting each of the first and second head poses.

8. The method of claim 1, wherein the three-dimensional scene includes at least a portion of a virtual object that is not visible from the second left and right focal centers relative to the first view point, and is visible from the second left and right focal centers relative to the second view point.

9. A virtual image generation system for use by an end user having an inter-ocular distance, comprising:

memory storing a three-dimensional scene;

a control subsystem configured for rendering a left synthetic image and a right synthetic image of the three-dimensional scene respectively from a first left focal center and a first right focal center relative to a first head pose of the end user, the first left and first right focal centers being spaced from each other a distance greater than the inter-ocular distance of the end user, the control subsystem further configured for warping the left synthetic image and the right synthetic image respectively to a second left focal center and a second right focal center relative to a second head pose different from the first head pose, the second left and right focal centers spaced from each other a distance equal to the inter-ocular distance of the end user, the control subsystem further configured for constructing a frame from the left and right warped synthetic images; and a display system configured for displaying the frame to the end user.

10. The virtual image generation system of claim 9, wherein the display system is configured for being positioned in front of the eyes of the end user.

11. The virtual image generation system of claim 9, wherein the display system includes a projection subsystem and a partially transparent display surface, the projection subsystem configured for projecting the frame onto the partially transparent display surface, and the partially transparent display surface configured for being position in the field of view between the eyes of the end user and an ambient environment.

12. The virtual image generation system of claim 9, further comprising a frame structure configured for being worn by the end user, the frame structure carrying the display system.

13. The virtual image generation system of claim 9, wherein the control subsystem comprises a graphics control subsystem unit (GPU).

14. The virtual image generation system of claim 9, wherein the left and right synthetic images are rendered in three dimensions and warped in two dimensions.

15. The virtual image generation system of claim 9, wherein the control subsystem is further configured for generating left depth data and right depth data respectively for the left synthetic image and right synthetic image, wherein the left synthetic image and the right synthetic image are respectively warped using parallax using the left depth data and the right depth data.

16. The virtual image generation system of claim 15, wherein the left synthetic image and the right synthetic image are rendered based on a first look-at point in the three-dimensional scene, and the left synthetic image and the right synthetic image are warped based on the first look-at point in the three-dimensional scene and a second look-at point in the three-dimensional scene.

17. The virtual image generation system of claim 9, further comprising one or more sensors configured for detecting the inter-ocular distance of the user.

18. The virtual image generation system of claim 9, further comprising a user orientation module configured for predicting an estimate of the first head pose and detecting the second head pose.

19. The virtual image generation system of claim 9, further comprising a user orientation module configured for detecting each of the first and second head pose.

20. The virtual image generation system of claim 9, wherein the three-dimensional scene includes at least a portion of a virtual object that is not visible from the second left and right focal centers relative to the first view point, and is visible from the second left and right focal centers relative to the second view point.

* * * * *